May 30, 1950      W. J. HUGHES      2,509,685

METERING DEVICE

Filed July 9, 1947      2 Sheets-Sheet 1

INVENTOR.
Walter J. Hughes,
BY

May 30, 1950 W. J. HUGHES 2,509,685
METERING DEVICE
Filed July 9, 1947 2 Sheets-Sheet 2
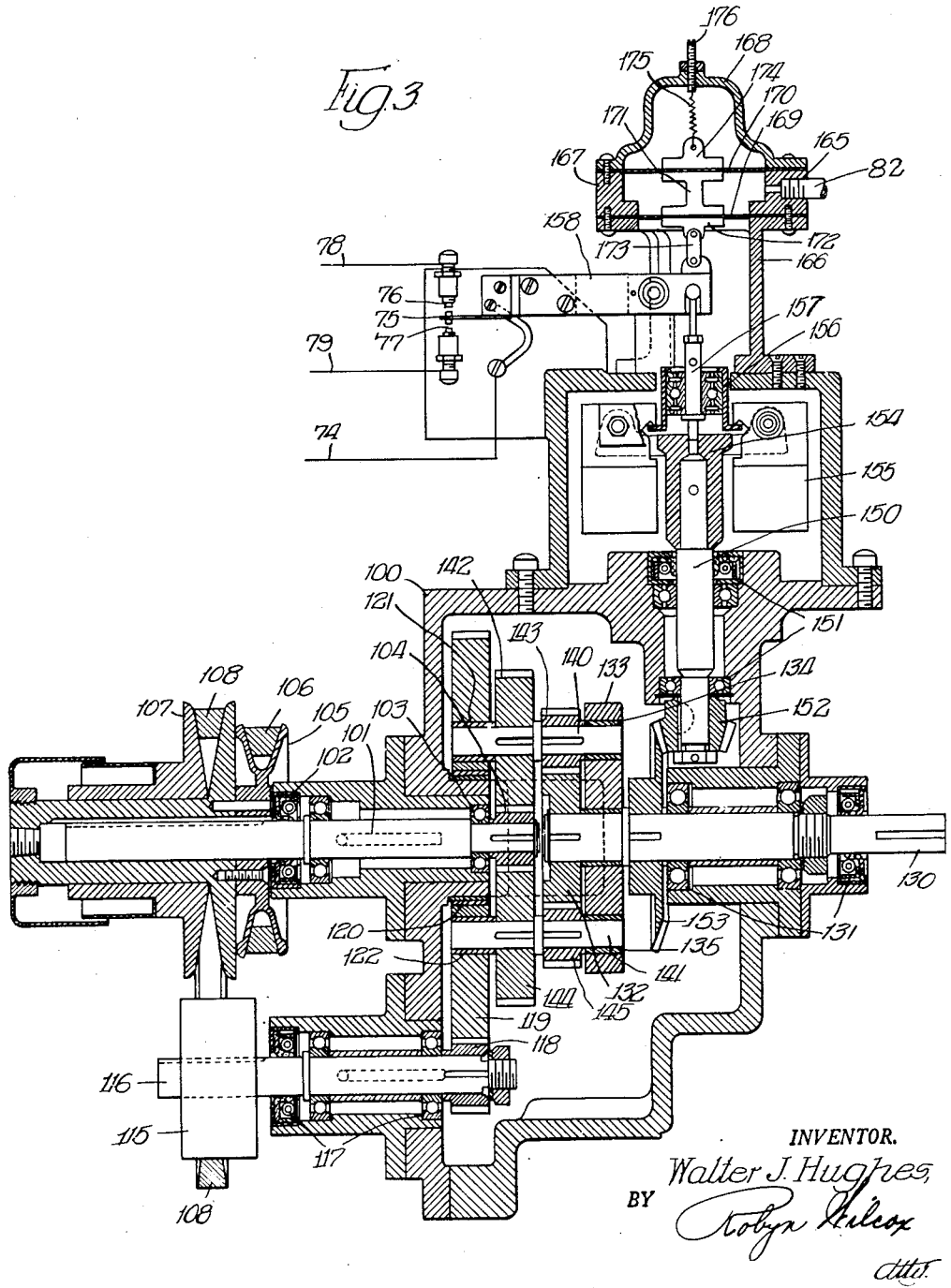
INVENTOR.
Walter J. Hughes,
BY Robyn Wilcox
Atty.

Patented May 30, 1950

2,509,685

UNITED STATES PATENT OFFICE 2,509,685

METERING DEVICE

Walter J. Hughes, Chicago, Ill., assignor to Infilco Incorporated, Chicago, Ill., a corporation of Delaware Application July 9, 1947, Serial No. 759,838

9 Claims. (Cl. 74—689)

This invention relates to a metering device adapted to convert a pressure utilized in the measurement of any condition to a speed of rotation of a shaft which varies as the square root of the pressure utilized in the measurement.

This invention is particularly applicable to a meter for measuring fluid flows and adapted to convert a pressure differential, such as that existing between the mouth and throat of a Venturi tube, to a speed of rotation of a shaft directly proportional to the rate of flow.

Another aspect, or object, of my invention is to provide a power driven shaft of variable speed, the speed varying proportionally to the square root of a pressure to be measured.

While many applications of my invention will be apparent to those skilled in the art, it is primarily designed for use in connection with liquid treating systems, such as water conditioning plants and the like. Most measurements in such a plant are secured from a pressure differential existing between two points in the system, and when rate of flow is being measured it is well known that the pressure varies as the square of the flow. Many means have been suggested for extracting the square root of such a pressure differential, in order to get readings, or work done, which is directly proportional to the rate of flow. My apparatus has particular utility when it is desired to use a motor to effect some control in such a plant, such as a motor driving a lime feeder in connection with a water softening plant. Obviously in such a case the rate of operation should be directly proportional to the rate of flow, and it is therefore necessary to provide a means for driving the machine to be operated, such as the lime feeder, according to the square root of the pressure differential. It is an object of my invention to utilize an ordinary motor rotating at a substantially constant speed and provide a mechanism which automatically converts such a constant speed of rotation to an angular velocity of the driven shaft which varies as the square root of the pressure differential utilized in such measurements.

These and other objects of my invention will be apparent from the drawings and detailed description, and in which:

Figure 3 is a vertical cross-sectional view of another embodiment of my invention.

Figure 1:
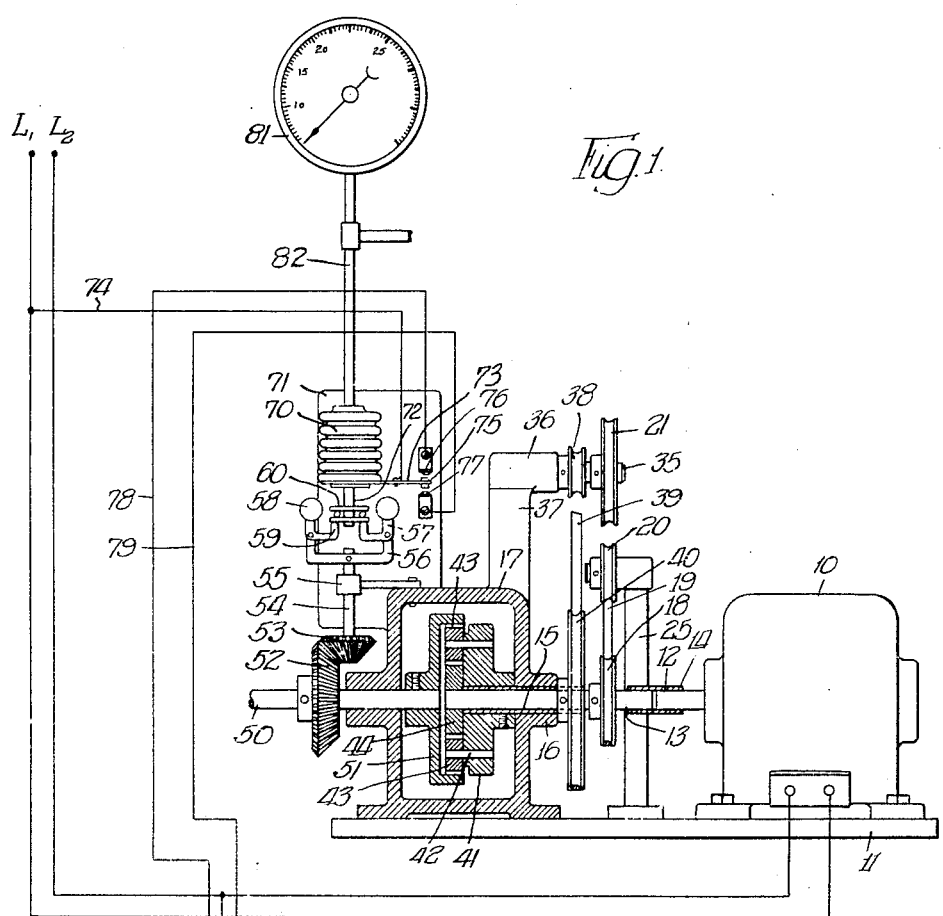
Figure 1 represents a partial cross-sectional view of a simple form of my invention with belts partially removed.

The apparatus shown in Figure 1 is a simple form of my invention. As indicated above I utilize a substantially constant speed motor 10, which for convenience is mounted upon a suitable base plate 11. It can be noted that while the motor 10 operates continuously, and at substantially constant speed, it is not necessary that the motor always operate at the same speed as slight variations in the speed of the motor, incident to fluctuations in current characteristics, are automatically adjusted in my apparatus. The motor is directly connected to suitable sources of power $L_1$ and $L_2$, as shown. The motor 10 can be of a size selected to perform the function or work desired, as the torque which is transmitted by the output shaft can be of any magnitude. A shaft 12 of the rotor of the motor is directly connected to a shaft 13 by any suitable coupling 14. The free end of the shaft 13 is journaled in a quill shaft, or sleeve, 15 which in turn is journaled in a suitable bearing 16 carried by the transmission case 17. A driving pulley 18 is pinned to the shaft 13 as shown. A belt 19 (best shown in Figure 2) passes over driving pulley 18, idler pulley 20, and a variable pitch pulley 21 (such as shown in enlarged view on the left hand side of Figure 3, pulley 107).

The idler pulley 20 is suitably journaled in an arm 25 which is pivotally mounted on the base plate 11 by any suitable means such as pin 26. The arm 25 is positioned by means of a reversible motor 27, and drive screw 28. The screw 28 is threaded into a nut 29 which is mounted on the arm 25, whereby the arm 25 is moved angularly by the reversible motor 27. The wiring and operation of the motor 27 will be described in detail hereafter.

The variable pitch pulley 21 is pinned to a shaft 35 rotatably journaled in a bearing 36, which may be mounted in an arm 37 carried by the transmission casing 17. Also mounted on the shaft 35 is a fixed diameter driving pulley 38, as shown. A belt 39 connects the fixed diameter pulley 38 to a pulley 40 which is rigidly secured to the sleeve, or quill shaft, 15. A planetary arm 41 is likewise pinned to the sleeve 15 to rotate therewith. The arm 41 carries a pair of shafts 42 on which are mounted planetary gears 43 and with said gears forms the speed varying or reaction member of the planetary gear train. A sun gear 44 is keyed to the shaft 13, meshing with the planetary gears 43.

An output shaft 50 is axailly aligned in the transmission casing 17, with the shaft 13. A ring gear 51 is pinned to the output shaft 50 and meshes with the planetary gears 43. The shaft 50 can be utilized to perform work, such as the operation of a chemical feeder which it is desired to control in direct proportion to the rate of flow being measured, or to operate a telemetering device or the like. Also mounted on the shaft 50 is a bevel gear 52, with which meshes a bevel pinion 53. The bevel pinion 53 is pinned to a shaft 54 journaled in bearing 55. The other end of the shaft 54 carries an arm 56 pinned thereto. A pair of bell crank arms 57 are pivoted on the member 56. The bell cranks 57, have weights 58 at their outer ends and their inner ends 59 bear upwardly against a thrust bearing 60. Thus the fly ball governor, which comprises the arm 56 and the bell cranks 57, rotates at a speed directly proportional to that of the output shaft 50. The centrifugal effect of the governor exerts a force upwardly which varies as the square of the velocity.

Opposing the upward thrust of the governor assembly is a bellows 70, the upper end of which is rigidly attached to a base 71, which preferably is carried by the transmission casing 17. To the lower end of the bellows is fixed a thrust rod 72 on which is mounted the thrust bearing 60. Also mounted at the lower end of the bellows is a contactor arm 73 which is directly connected by conductor 74 to source of power L1, the free end of the contactor arm 73 bearing a contact member 75. Associated with the contact member 75 are two contacts 76 and 77 which are connected by means of conductors 78 and 79, respectively, to the reversible motor 27. The motor 27 is also connected to source of power L2 by means of conductor 80.

The bellows 70 is connected to a conduit 82 connecting to a source of pressure by which operation of my apparatus is to be controlled. This source of pressure may be a direct connection to a pressure differential creating device, but preferably will be a source of controlled air pressure varying directly as the pressure differential, such as the apparatus shown in my copending application, Serial No. 680,506, filed June 29, 1946. If desired a gauge 81 can also be connected to the pressure conduit 82, as shown.

It is obvious that when the thrust of the bellows, acting downwardly, is exactly equal to the thrust of the fly ball governor, acting upwardly, the contact 75 will be disengaged from both contacts 76 and 77 and the circuit to motor 27 will therefore be broken. When such a condition arises the position of the idler pulley will remain constant and the speed of rotation of the output shaft 50 will likewise remain constant. When the condition being measured varies, the pressure within the bellows 70 will either increase or decrease, causing the balance between the thrust of the bellows and thrust from the governor to be upset, whereby the contact 75 will engage either contact 76 or 77, completing a circuit to the motor 27 to operate it in one direction or the other until a new speed of transmission output and also governor speed sets up a new condition of equilibrium. It will be obvious that as the position of the idler arm 25 is changed, the tension placed on the belt 19, by the positioning of the idler pulley 20, automatically changes the pitch radius of the variable pitch pulley 21, thereby changing the relative movement between the sun gear 44 and the planetary arm 41, thus automatically varying the speed of rotation of the output shaft 50.

In one size of the apparatus of my invention I use sun and planetary gears 44 and 43 of 1 inch in diameter, a ring gear 51 of 3 inches in diameter, a sun shaft pulley 18 of 1¾ inches in diameter, a pulley 38 of 1.68 inches in diameter, a pulley 40 on the sleeve of 3½ inches in diameter, and an automatic variable pitch pulley having a pitch diameter of between 1¾ inches and 3½ inches. In such an apparatus, assuming a motor speed of 1750 R. P. M. when the variable pitch pulley is at a diameter of 3.35 inches the planet arm rotates at a speed of 432 R. P. M., while if the diameter of the variable pitch pulley is changed to 1.8 inches then the planet arm rotates at 805 R. P. M.—which figures can be readily computed by those skilled in the art. The sun gear 44 however rotates at a constant velocity, as it is directly connected to the motor 10. As is well known in the art, the speed of rotation of the ring gear 51 is determined by the relative velocities of the sun gear 44 and the planetary arm 41 as in epicyclic gear trains and the output shaft or ring gear speed can be varied from zero to maximum by proper relation of speeds of sun gear and planet arm. The variation in the angular position of the idler pulley arm 25 which directly controls the speed of rotation of the planetary arm, indirectly controls the angular velocity of the output shaft 50. Through the switch arrangement shown, the speed of the output shaft 50 is controlled so that the thrust of the governor mechanism just balances the thrust of the bellows 70, thereby providing a speed of rotation of the output shaft varying as the square root of the pressure. If the pressure is derived from a Venturi tube, or the like, then my apparatus provides a speed of rotation which varies directly as the flow being measured.

It is well known that in an epicyclic gear train having a first member driven at a substantially constant speed and a second member driven at variable speeds, the output member can be controlled to run at speeds from zero to any desired maximum by a relatively small change in speed of the second member. Thus, a relatively small movement of the idler pulley arm, with a relatively small change in the pitch diameter of the variable pitch pulley, provides a considerable change in the speed of the output shaft. Specifically, in the above example, a change in the diameter of the variable pitch pulley of about 1½ inches (from 1.8″ to 3.35″) provides a change in velocity of from about 400 R. P. M. to about 800 R. P. M. It is obvious that one utilizing the principle of my invention need only determine the maximum speeds desired in the output shaft, and then it is a matter of easy computation to determine the necessary sizes of gears and pulleys.

Figure 2:
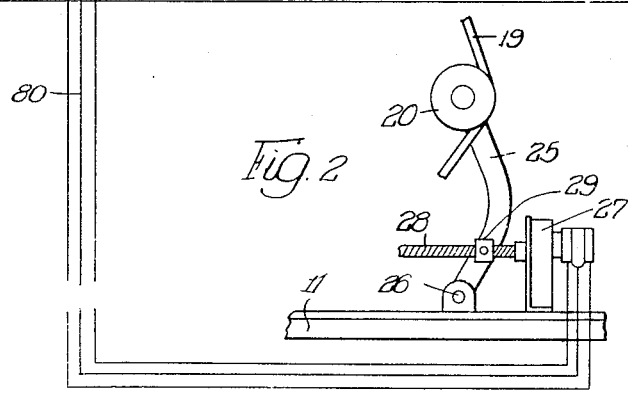
Figure 2 is a side view of the idler pulley mounting.

The embodiment shown in Figure 3 works on the same principle as that shown in Figures 1 and 2. In this form the planetary gearing is contained in a transmission casing 100, the sun shaft 101 being journaled in suitable bearings 102 and 103. The sun gear 104 is keyed to the inner end of the shaft, as shown. Fixed diameter input pulley 105 is keyed to the outer end of the sun shaft 101 and is driven by a motor, not shown, through means of a belt 106. A variable pitch pulley 107 is directly connected to the input pulley 105 as shown. The belt 108 passes over the variable pitch pulley 107, an idler pulley, not shown, and pulley 115. In this embodiment the idler pulley is mounted and operated the same as in Figure 1, and for sake of simplicity is not shown in Figure 3, although its operation will be readily understood by those skilled in the art.

The pulley 115 is keyed to a shaft 116 and preferably is of the wide type in order to permit axial displacement of the belt 108 as the pitch diameter of pulley 107 varies. The shaft 116 is suitably journaled in bearings 117. A pinion 118 is keyed to the inner end of the shaft 116, as shown. A relatively large annular gear 119 meshes with pinion 118 and is suitably journaled in bearing 120 which surrounds the sun shaft 101. The annular gear 119 serves as a planetary arm but is driven directly by the pinion 118 at a variable speed and like the arm 41 in the embodiment of my invention shown in Figure 1, forms the speed varying or reaction member of the planetary gear train.

The output shaft 130 is coaxially aligned with the sun shaft 101 terminating close to the sun gear 104 as shown. The output shaft 130 is journaled in suitable bearings 131, and at its inner end carries a pinion 132 which is keyed thereto. Rotatably mounted on the output shaft 130 is a rotatable arm 133, which rotates freely with respect to the output shaft 130. A pair of diametrically opposed bearings 134 and 135 are provided in the rotatable arm 133.

The annular gear 119 is provided with a pair of diametrically spaced bearings 121 and 122, which are located a radial distance from the center of rotation of the gear equal to that of the bearings 134 and 135 from their center of rotation. A connecting shaft 140 has one end journaled in bearing 121 of the annular gear 119 and the other end journaled in the bearing 134 of the arm 133. A second connecting shaft 141 has one end journaled in bearing 122 of annular gear 119 and the other end journaled in bearing 135 of the arm 133. Thereby the arm 133 is rotated at the same speed as the annular gear 119. A gear 142 is keyed to shaft 140 and meshes with sun gear 104, while a second gear 143 is keyed to the shaft 140 and meshes with the gear 132 on the output shaft 130. Similarly, a gear 144 is keyed to the shaft 141 and meshes with sun gear 104 and a second gear 145, also keyed to the same shaft, meshes with gear 132. Thus the sun gear 104 drives the planetary gears 142 and 144, respectively, and these in turn drive the gears 143 and 145, respectively, the latter meshing with gear 132 to drive output shaft 130. However, the angular velocity of the gears 142 and 144 does not depend upon the velocity of sun gear 104, which is constant, but upon the relative motion, or relative angular velocity, of the sun gear 104 and the large annular gear 119. The velocity of the annular gear 119 in turn depends upon the pitch of the pulley 107 which is adjusted by the positioning of an idler pulley, such as 18 of Figure 2.

The governor arrangement shown in Figure 3 differs somewhat in detail from that shown in Figure 1. A shaft 150 is journaled in suitable bearings 151. A bevel gear 152 is keyed to the inner end of the shaft 150 and meshes with a bevel pinion 153, keyed to the output shaft 130. An arm member 154 is pinned to the shaft 150 and carries a pair of pivotally mounted and weighted arms 155. Governor arms 155 engage the bearing member 156 which is rotatably mounted with respect to a connecting link 157 which is pinned to the lever arm 158. Lever arm 158 carries a contact 75, as shown.

Opposing the thrust of the weighted governor arms 155, which operates downwardly in this embodiment, is the force of a controlled air pressure acting upwardly in a diaphragm chamber 165, which is mounted above the lever arm 158. The diaphragm chamber preferably will comprise three sections: A casing portion 166 mounted on the transmission casing 100; an intermediate member 167; and an upper member 168. Clamped between the three members are two diaphragms 169 and 170, respectively, the effective area of the upper diaphragm 170 being in excess of that of the lower diaphragm 169. Due to the difference of the effective areas of the diaphragms the pressure in the intermediate chamber formed by the section 167 provides a net force operating upwardly. The two diaphragms 169 and 170 are held in spaced relationship by a spacing member 171. Centering plate 172 of the lower diaphragm 169 carries a link 173 which is pinned to the lever arm 158. The outer diaphragm plate 174 of the upper diaphragm 170 is partially supported by a spring 175, the tension of which can be regulated by a suitable adjusting screw 176. The force of the spring 175 should be adjusted so as to balance the effect of the weight of parts attached to the diaphragms, their centering plates and spacer bar, so that at zero position (when a motor driving the belt 106 is at rest and there is no pressure in the pressure chamber 165) the contact 75 would be intermediate the two contact points 76 and 77.

The operation of this embodiment will be readily understood. When the centrifugal force derived from the governor mechanism exactly balances the net force from the air pressure within the diaphragm, or pressure, chamber 165, the setting of the idler pulley (such as 18 in Figure 2) will remain constant and the relative velocity of the sun gear 104 and the annular gear 119 will remain constant. As the pressure changes, the balance between the two forces is up-set causing a circuit to the reversible motor to be closed through contact 75, whereby the idler arm 25 of Figure 2, is moved, which changes the radius of the variable pitch pulley 108, and thus changes the relative velocities between the sun gear 104 and the annular gear 119. It is obvious to those skilled in the art that the velocity of the output shaft 130 will vary from zero to maximum speeds according to the difference in velocity between the sun gear 104 and the annular gear 119. As the centrifugal force of the governor mechanism varies as the square of the velocity, the speed of rotation of the output shaft 130 will necessarily vary according to the square root of the pressure exerted upon the diaphragm. In the process of measuring a flow through a flow system, which I utilize to illustrate my invention, the pressure in the chamber 165 will vary as the square of the flow to be measured, thus providing a speed of rotation of shaft 130 directly proportional to the rate of flow to be measured.

It will be obvious to those skilled in the art that my apparatus provides a device for controlling the output speed of a shaft directly proportional to a flow or, which is saying the same thing, varying as the square root of a pressure differential used in the measurement of the flow. It is also obvious that the power delivered by output shaft 130 can be of any desired magnitude, as my apparatus works equally well with large or small motors. Manifestly many modifications and variations of the invention herein before set forth may be made by persons skilled in the art without departing from the spirit and scope thereof. Also it will be manifest that the apparatus of my invention could be applied to many situations and the appended claims therefore are not to be limited to measurement of a fluid flow, which has been used to illustrate the workings of my invention.

I claim:

1. In an apparatus of the class described, an epicyclic gear train having a drive member rotatable at a constant speed, a driven output member, and a reaction member rotatable at variable speeds to obtain speeds of the output member varying from zero to maximum, motor means for driving said drive member and said reaction member, means for varying the speed of rotation of said reaction member, a pressure responsive member, a centrifugal governor driven by the output member, and adapted to react against the force exerted by said pressure responsive member, and switching means operating by changes in force exerted by said pressure responsive member and controlling the operation of the said means for varying the speed of rotation of said reaction member.

2. In an apparatus of the class described, an epicyclic gear train having a driving member, a reaction member, and a driven output member, means for driving said driving member at a constant speed, means for driving said reaction member at a variable speed, a pressure responsive member, a centrifugal governor, a drive connection from said output member to said governor, said governor being adapted to react against the force exerted by said pressure responsive member, and switching means operating by lack of balance between the force of the pressure responsive member and the force of the governor for controlling the speed of said reaction member.

3. In a metering device, an epicyclic gear train having a driving member, a reaction member, and a driven output member, a constant speed motor directly connected to said driving member, whereby said driving member is rotated at a constant speed, means including a variable pitch pulley connecting said motor to the reaction member, a positioning means controlling the pitch of said variable pitch pulley, a reversible motor operating said positioning means, a pressure responsive member adapted to be actuated by the pressure proportionate to a rate of flow to be measured, a centrifugal governor driven by the output member and adapted to react against and balance the force exerted by said pressure responsive member, and a switch operated by unbalance of said pressure responsive member and governor and controlling the flow of power to said reversible motor.

4. A metering apparatus for rotating an output member at a speed varying according to the square root of variations in a force comprising an epicyclic gear train having a driving member, a reaction member, and a driven output member, a constant speed motor connected to said driving member, a variable speed drive connection from said motor to said reaction member, a pressure responsive member positionable by variations in said force, a governor driven by said output member and adapted to react against and balance the force of said pressure responsive member, and switching means operated by a lack of balance between the force of said pressure member and said governor and controlling the operation of said variable speed drive connection.

5. In an apparatus of the type described, an epicyclic gear train including a sun gear, means adapted to drive said sun gear at substantially constant speed, a planetary arm forming a reaction member for the gear train, means including a variable pitch pulley member for driving said planetary arm, means for changing the pitch of said variable pitch pulley member to vary the speed of said planetary arm, planetary gears carried by said planetary arm and meshing with said sun gear, output means driven by said planetary gears, a governor driven by said output means, a pressure responsive member adapted to be connected to a source of pressure and to balance the force of said governor, and a switch operated by lack of balance between the governor and the pressure responsive member, said switch being connected to operate said means for changing the pitch of said variable pitch pulley.

6. In an apparatus of the type described, a motor operable at substantially constant speed, a sun gear driven by said motor, a variable pitch pulley, a planetary arm driven by said variable pitch pulley and forming a reaction member for the planetary gear train, planetary gears meshing with said sun gear and mounted on said planetary arm, an output gear driven by said planetary gears, a pressure responsive member adapted to be connected to a source of pressure, a governor, a drive connection from said output gear to said governor, the thrust of said governor opposing the thrust of said pressure responsive member, a switch operated by the unbalance of the opposing forces of said pressure responsive member and said governor, a reversible motor connected to said switch and controlled thereby, and means operable to vary the pitch of said variable pitch pulley, said means including a movable idler pulley positionable by operation of said reversible motor.

7. In a power transmission device adapted to provide a variable output speed directly proportional to the flow of a liquid, a pressure responsive device, means adapted to supply pressure to said pressure responsive device proportional to the square of the flow of a liquid, a motor, an epicyclic gear train having a driving member driven by said motor, a driven output member and a reaction member, a variable speed drive connection from said motor to said reaction member, means for varying the speed of said variable speed drive connection, and means controlling operation of said speed varying means including a governor rotatably driven by said output member, an operative connection between said governor and said pressure responsive device, and operative to actuate said speed varying means, upon unbalance of said pressure responsive device and governor, to vary the speed of said variable speed drive connection until a new balance has been established between said governor and said pressure responsive device.

8. In a power transmission device adapted to provide a variable output speed directly proportional to the flow of a liquid, a pressure responsive device, means adapted to supply pressure to said pressure responsive device proportional to the square of the flow of a liquid, a motor, an epicyclic gear train having a driving member driven by said motor, a driven output member and a reaction member, a variable speed drive connection from said motor to said reaction member, speed varying means including a reversible motor for varying the speed of said variable speed drive connection, a control switch movable to one position to connect said reversible motor to rotate in one direction and movable to another position to connect said reversible motor to operate in a reverse direction, a centrifugal governor rotatably driven by said output member and connected to said pressure responsive device to oppose the force exerted thereby, an operative connection from said governor and pressure responsive device to said switch, to move said switch to its several operative positions upon unbalance between said pressure responsive device and governor, to connect said reversible motor to operate in one direction or another.

9. In a power transmission device adapted to provide a variable output speed directly proportional to the flow of a liquid, a pressure responsive device, means adapted to supply pressure to said pressure responsive device proportional to the square of the flow of a liquid, a motor, an epicyclic gear train having a driving member driven by said motor, a driven output member and a reaction member, a variable speed drive connection from said motor to said reaction member including a variable pitch pulley, a reversible motor, means driven by said reversible motor to vary the pitch of said pulley, a centrifugal governor rotatably driven by said output member and opposed by the force exerted by said pressure responsive device, a control circuit for said reversible motor, a switch in said control circuit and positionable to connect said circuit to cause said reversible motor to rotate in one direction or another, and means operatively connecting said switch with said pressure responsive device and governor, to operate said switch upon changes in pressure on said pressure responsive device causing unbalance between said governor and pressure responsive device.

WALTER J. HUGHES.

REFERENCES CITED

The following references are of record in the file of this patent:

FOREIGN PATENTS

| Number | Country | Date |
|---|---|---|
| 822,087 | France | Sept. 13, 1937 |